Aug. 8, 1972 S. M. DOCKERTY 3,682,609
CONTROLLING THICKNESS OF NEWLY DRAWN GLASS SHEET
Filed Oct. 6, 1969 3 Sheets-Sheet 1

INVENTOR.
Stuart M. Dockerty
BY
ATTORNEY

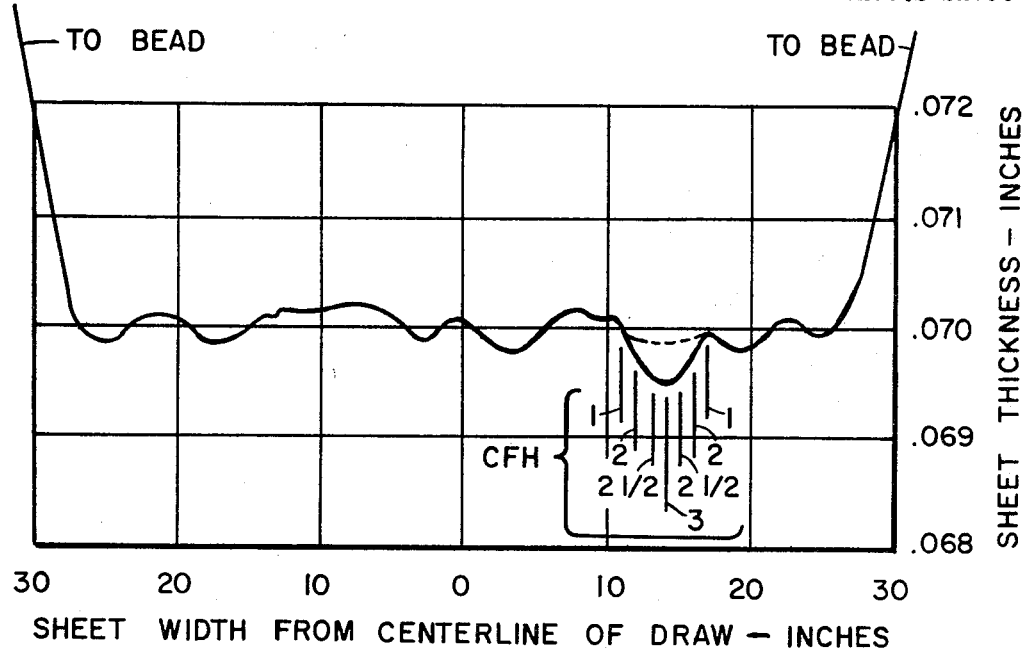
Fig. 3
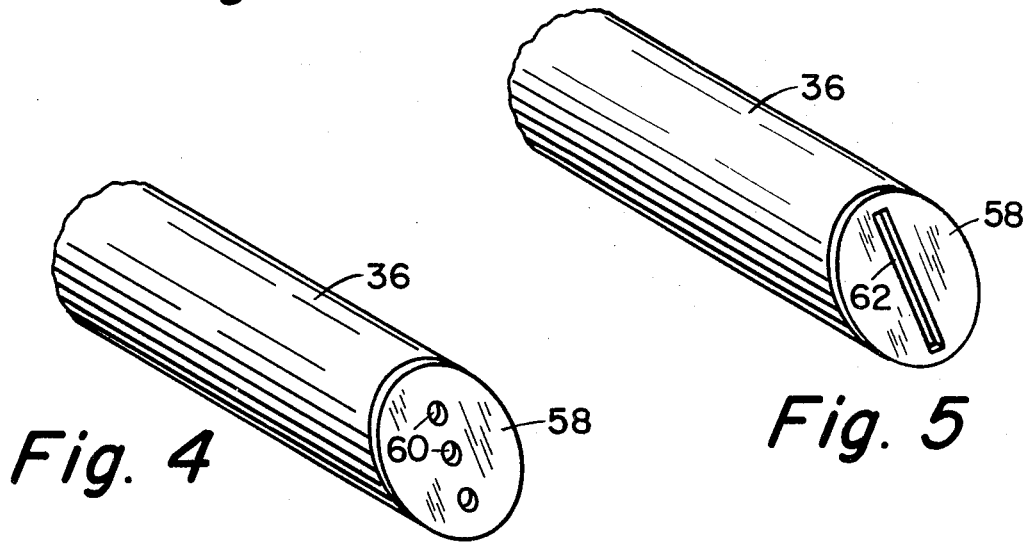
Fig. 4
Fig. 5
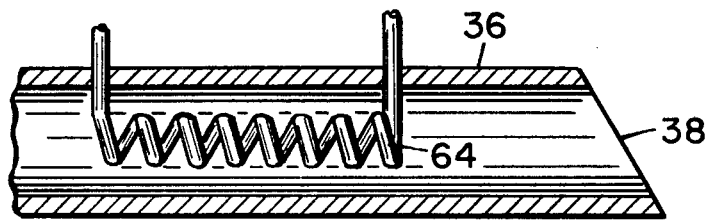
Fig. 6
INVENTOR.
Stuart M. Dockerty
BY
ATTORNEY

United States Patent Office 3,682,609
Patented Aug. 8, 1972

3,682,609
CONTROLLING THICKNESS OF NEWLY DRAWN GLASS SHEET
Stuart M. Dockerty, Corning, N.Y., assignor to Corning Glass Works, Corning, N.Y.
Filed Oct. 6, 1969, Ser. No. 863,885
Int. Cl. C03b 17/00
U.S. Cl. 65—83       10 Claims

ABSTRACT OF THE DISCLOSURE

Variation in temperature profile across the width of newly formed glass sheet produces objectionable thickness variations which adversely effect optical quality. Precision control of the temperature profile across the width of newly drawn sheet glass is obtained through the provision of a plurality of closely spaced, individually regulated fluid control jets or tubes positioned across the width of such sheet within a closure with the exit ends of such tubes being shielded from the glass by means of a wall member having high conductivity, low expansion, and high emissivity.

BACKGROUND OF THE INVENTION

When forming sheet material from molten glass it is necessary to increase the viscosity of the molten glass by reducing the temperature thereof in order to maintain the integrity of the newly formed sheet. However, generalized cooling of the sheet has a tendency to produce variations in thickness across the width of the sheet due to differential cooling patterns produced by such generalized cooling means. Various attempts have been made in the past to minimize the thickness variations by supplementing the general cooling means with various forms of localized cooling media such as open-ended air tubes, water cooled pipes, and individual containers for the circulation of fluids. However, these approaches have not been entirely satisfactory since the open-ended air tubes produce undesirable chimney-like air currents upwardly along the newly formed sheet material, which induce additional thickness variations. Water cooled pipes also have a tendency to induce air drafts which produce temperature gradients along the extent of their flow path as they extract heat from the molten material forming the sheet. Containers for circulating fluids are not only plaqued with a temperature differential between the inlet and outlet ends, but also the partitions or wall members forming each individual container function as heat sinks and produce objectionable cooling in such localized areas along the sheet, adversely affecting its thickness distribution.

The present invention obviates the problems heretofore encountered in providing localized cooling of molten material forming glass sheet by utilizing a plurality of individually controlled air jets or streams positioned within an unobstructed closure extending across the width of the sheet adjacent to the point of draw.

SUMMARY OF THE INVENTION

The improved temperature control system of the present invention includes a housing or closure positioned on opposite sides of newly drawn glass sheet adjacent to the molten material from which the sheet is drawn, and preferably near the point of draw. Each housing has a continuous or uninterrupted front wall facing the molten material forming the sheet, and extending across the width thereof. A plurality of fluid conduit tubes or air jets are positioned in an equally spaced apart arrangement across the width of each housing, with outlet end portions of such tubes positioned within a row adjacent the back surface of the front wall. Each fluid conduit or air jet is provided with means for individually controlling the flow therethrough and may be moved laterally toward and away from the back surface of said front wall so as to vary the width of the localized effect produced by the fluid discharged against such surface by each conduit. Preferably the fluid conduits in the opposing housing members are offset laterally with respect to each other so that the cooling effect produced by the conduits on one side of the newly formed sheet will be operative in localized areas intermediate the controlled areas on the opposite side of the sheet, so as to obtain more precise temperature control and therefore thickness uniformity across the width of the sheet.

The front wall of each housing, in order to be operative, is formed of a material having high conductivity, low thermal expansion, and high emissivity constant with time and temperature. Preferably the front wall is formed from a silicon carbide slab and the back surface thereof, except for the bounding borders, is free from contact with any supporting structure which would cause thermal discontinuity across the face of the slab. Further, although water cooled pipes may be provided within each housing for generalized cooling of the refractory material, the interior of each housing is virtually uninterrupted so as to facilitate uniformity of cooling across the entire width of the back surface of the forward wall of such housing. If desired, each housing may be moved laterally along a track toward and away from the line of draw.

In order to provide further flexibility in the control of the temperature profile across the width of the sheet, individually controlled heating elements may be positioned within the various fluid conduits to preheat the air which is projected against the localized areas of the back surface of the forward wall. With the above described system it is possible to sense variations in the thickness profile of newly formed sheet and make immediate control adjustments to correct any deficiencies in thickness uniformity. That is, should a thickness trace across the width of newly formed sheet indicate that a certain area may be thinner than desired, a control valve on each fluid conduit associated with such area is adjusted to increase the amount of cooling applied in such localized area, and thereby increase the viscosity in such areas and produce more uniform thickness across the width of the sheet.

Normally the position of the outlet end of the fluid conduit tubes is not varied with respect to the back surface of the front wall, since simple changes in flow rate will produce the desired result; however, the lateral positionment may be changed if desired so as to vary the area of influence of each such tube or conduit with respect to the glass sheet. That is, if a tube is moved transversely away from the back surface of the front wall, the fluid discharged by such tube will effect a wider area of the sheet with reduced intensity, whereas when the tube is moved transversely toward such back surface, the gaseous discharge therefrom will effect only a relatively narrow localized area but with greater intensity.

Should a thickness trace indicate that a particular area across the width of the sheet is thicker than desired, it may be corrected by cooling adjacent zones, or the electrical windings associated with the fluid conduits in such area may be energized and the individual control valves adjusted to increase flow and thereby provide additional heat to decrease the viscosity of the glass in such area and thin such section to enhance thickness uniformity across the width of the sheet. This latter procedure is, of course, only operative when the temperature of the heated air is higher than that of its impingement zone on the back surface of the front wall. The high conductivity and emissivity of the silicon carbide front wall are essential to the effectiveness of the control produced by the gaseous discharge from the fluid conduit tubes, since these properties provide a diffused rapid heat transfer.

An object of the invention has been to provide an improved system for precisely controlling the temperature profile across the width of newly formed sheet glass wherein a closure having an uninterrupted front wall facing the molten material forming the newly produced glass sheet is provided with a plurality of individually controlled air jets or nozzles positioned across the back surface of said wall. The various jets are equally spaced apart transversely across the width of such forward wall and the distance between the outlet end of each jet and such back surface is adjustable to varying the area of intensity of each such jet on the back surface. Heating elements may be positioned within the fluid jet conduits to vary the temperature of the air stream impinged upon the back surface of the front wall.

A further object of the invention has been to provide improved cooling construction for controlling the thickness of glass sheet which includes a housing having a plurality of equally spaced-apart and individually controlled fluid conduit means, wherein the housing has a forward wall facing the molten glass sheet formed of material having relatively high conductivity, low thermal expansion, and high emissivity, which is constant with time and temperature to thermally transfer the heat control effect produced by the fluid conduit means to the molten material forming the sheet glass so as to produce a subtsantially uniform temperature profile across the width of such sheet.

BRIEF DESCRIPTION OF THE DRAWINGS

FIG. 3 is a graph illustrating how changes may be made to the thickness profile of a sheet of glass through the utilization of the present invention.

FIGS. 4 and 5 are fragmental views of various embodiments of fluid conduits which may be utilized with the present invention.

FIG. 6 is a fragmental cross-sectional view in elevational of a further embodiment, illustrating a heating element positioned within a conduit member.

DESCRIPTION OF THE PREFERRED EMBODIMENTS

Figure 1:
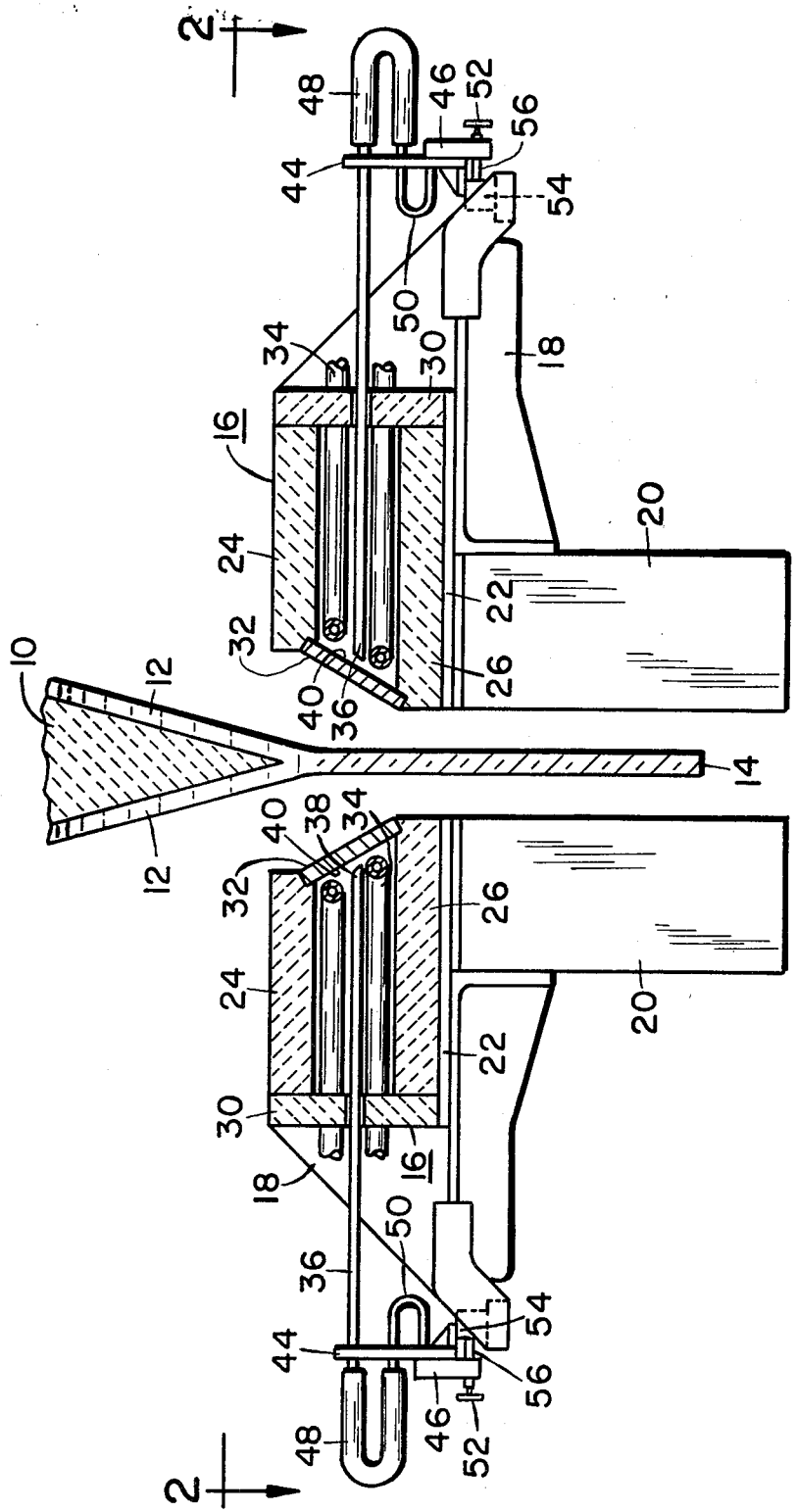
FIG. 1 is an elevational view in section of apparatus embodying the present invention.
Figure 2:
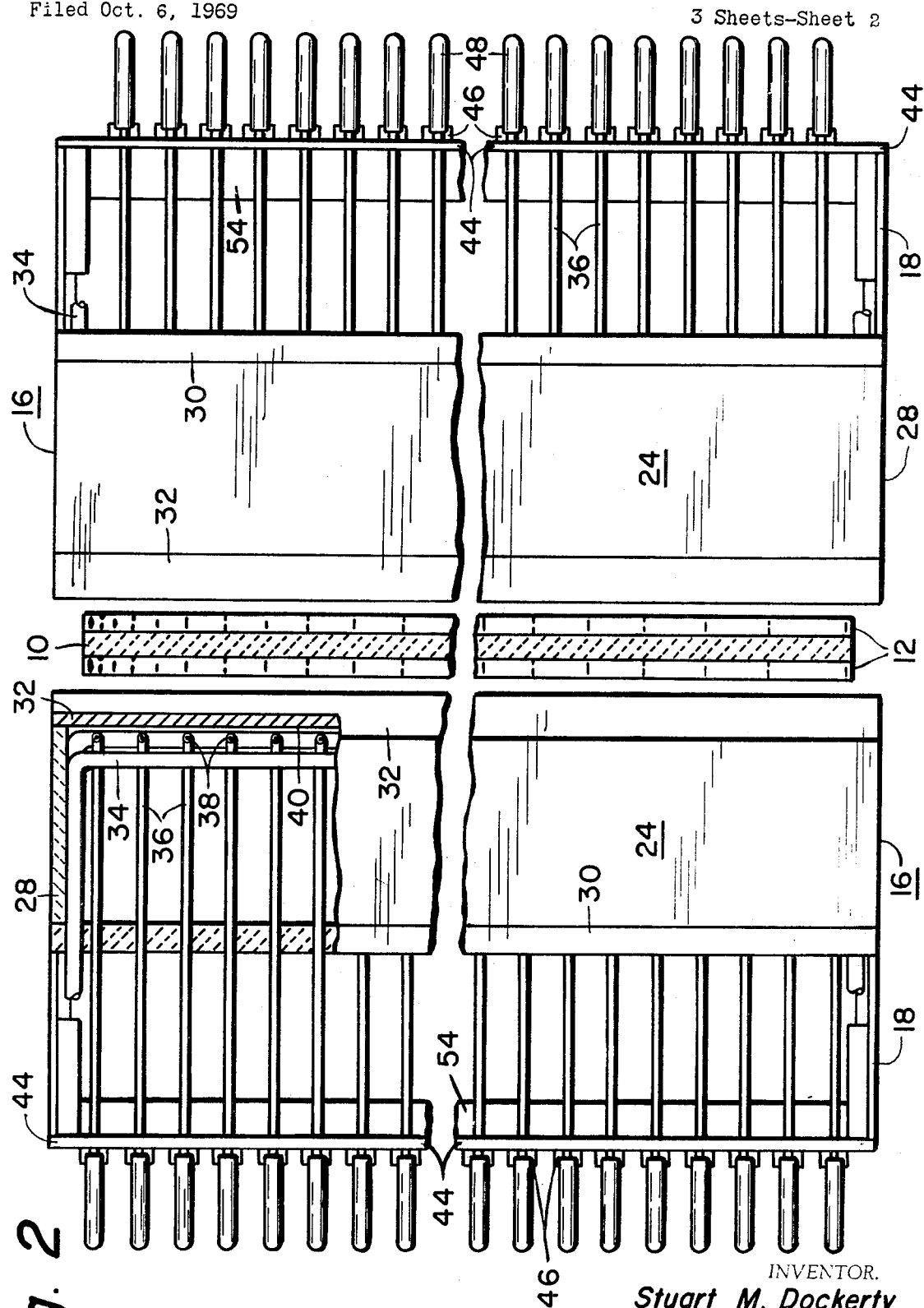
FIG. 2 is a top plan view, partially in cut-away section taken along line 2—2 of FIG. 1.

Referring now to the drawings, and particularly to FIGS. 1 and 2, a fragmental portion of an overflow downdraw forming member 10 of known construction, such as shown in U.S. Patents Nos. 1,829,641 and 3,338,696, is shown having molten glass 12 flowing down opposite sides thereof and joining at a point of draw to form newly drawn sheet 14. The thickness of the flows of molten glass and the sheet have been exaggerated for purposes of illustration.

A pair of closure assemblies or housings 16 are shown positioned on opposite sides of the newly formed sheet 14 by means of supporting structures 18 and refractory blocks 20. The housings 16 may be moved inwardly and outwardly with respect to the sheet 14 by any suitable means such as a rack and pinion along slide rails or tracks 22. Each housing 16 is formed with a top wall 24, bottom wall 26, end walls 28, rear walls 30, and front wall 32, all of which may be of refractory block material as shown. The front wall 32, however, must be formed of a material having high thermal conductivity, low expansion, and high emissivity, which is constant with time and temperature such as silicon carbide. Silicon carbide, for instance, has a thermal conductivity of $$110 \frac{\text{B.t.u.-in.}}{\text{hr.-ft.}^2\text{-}^\circ \text{F.}} \text{ at } 1200^\circ \text{ C.}$$

an expansion coefficient of $45 \times 10^{-7}/^\circ$ C., and an emissivity of .9, which is constant with both time and temperature. The high thermal conductivity is not only necessary to rapidly transfer heat through the front wall, but also to diffuse and smooth out any sharp temperature gradients to which such wall portions may be subjected. In view of the fact that the front wall is subjected to a substantial temperature differential between cool-down and heat-up operations, it is necessary that such wall have a low expansion coefficient so as to prevent thermal distortion or bowing, such as would be occasioned by a metal wall. Such distortion would result in wall portions being of unequal distances from the sheet glass, thereby producing a deleterious streaked or unequal cooling effect. The constant high emissivity of silicon carbide is necessary to maintain even controllable temperatures through constant radiation absorption, whereas other materials such as metals have a tendency to oxidize and form scale, thus varying the degree of emissivity with time and temperature.

Each closure or housing 16 may be provided with general cooling means 34, connected to a suitable source of fluid, such as water, for generally extracting heat to maintain the temperature of the housing within operable limits. A plurality of air jets or fluid conduit tubes 36 are equally spaced-apart and positioned within a row across the width of each housing, with the nozzle or outlet end 38 thereof positioned in spaced-apart relationship from the back surface 40 of the front wall panel 32. Each fluid conduit 36 extends outwardly through an opening in the back wall 30 of each housing 16 and is slidably supported at its rearward end by an upright bracket 44. Each fluid conduit pipe 36 is connected to its own individual flowrator meter 46, which is also mounted on bracket 44, by means of flexible U-shaped connection 48 and tubular conduit 50. Each flowrator meter 46 is provided with a control valve 52, and is connected to a manifold 54 by means of connecting pipe 56. The flexible U-shaped connection 48 and the slidable support by bracket 44 permit the conduits 36 to be moved laterally with respect to the back surface 40 of front wall panel 32, so as to vary the effect of the fluid discharged from nozzles 38 on such panel. Flowrator meters 46 are well known in the art and may be of any suitable type such as model 10A1347N produced by the Fisher and Porter Company of Warminster, Pa.

Referring now to FIG. 3 a graphic illustration of how the invention operates is presented. That is, FIG. 3 illustrates an imaginary thickness profile across the width of draw of a newly formed sheet of glass. The profile indicates that the sheet has a thin section or streak approximately 15 inches to the right of the centerline, and accordingly the control valves 52 associated with the individual air jets or fluid conduits 36, positioned adjacent such thinned section, would be manipulated to provide cooling air flow to the back side 40 of front wall panel 32 adjacent such thinned section. As an example, the control valve associated with the conduit 36 positioned adjacent the center of the thinned section would be regulated to provide an air flow of approximately 3 cubic feet per hour (c.f.h.) with the control valve 52 on the adjacent outlying fluid conduits 36 being regulated to provide a flow of 2½, 2, and 1 c.f.h., respectively. Since the fluid conduit tubes 36 are preferably positioned approximately 1" apart, and are staggered on opposite sides of the sheet, precision control down to ½" along the sheet width can be obtained. Further, the high conductivity of the silicon carbide front wall provides a diffusion effect to smoothly distribute the cooling supplied by the jets to the sheet and thereby increase its viscosity to produce a more even thickness trace as indicated by the dash lines in FIG. 3.

The cooling air supplied to the various air jets or fluid conduits 36 by the manifold 54 is obtained from the ambient atmosphere and maintained at a pressure slightly above atmospheric by any suitable means such as a controllable fan.

FIGS. 4 and 5 illustrate further embodiments of nozzle or outlet ends for the air jets or fluid conduits 36. That is, the discharge nozzles of the tubes 36 may be modified to provide various desired flow patterns. As shown in FIG. 4, the fluid conduit tube 36 is provided with a closed end portion 58 having a plurality of linearly spaced apart and vertically aligned circular discharge openings 60. FIG. 5, on the other hand, discloses a fluid conduit tube 36 having a closed end portion 58 provided with a continuous vertically-oriented slit-like discharge opening 62. Both embodiments provide discharge flows with narrow band widths for more precise control.

FIG. 6 discloses a further embodiment wherein the fluid conduit tube 36 is provided with an electrical heating element 64, such as a platinum wire controllably connected to an electrical source, which may be energized to heat the air supplied by such conduit to the back surface 40 of from wall panel 32. That is, should the thickness trace indicate that a particular portion of the sheet exhibits an unwarranted thickness, not only are the valves 52 associated with the fluid conduit tubes 36 in such area activated, but also the heating elements 64 within such tubes are energized to heat the air supplied thereby to the back surface of the silicon carbide front wall. Accordingly, the heated air retards cooling in such area, causing the viscosity of the glass in such thickened area to decrease, thereby thinning the undesirable thickened portion to provide a smooth uniform thickness across the extent of the sheet. Although the open outlet end portion 38 and closed end portion 58 are shown on a taper to coincide with the slant of the front wall panel 32 to provide uniform distribution, it will be understood that the outlet end of the tube 36 may be of any desired configuration to conform with the contour of the panel facing the molten glass, and accordingly such discharge end may be perpendicular to the longitudinal axis of the tubes. Since the housings 16 are in fact closed structures to prevent undesirable cooling currents or flows from contacting the molten glass, suitable openings may be provided in the rear wall 30 to permit the discharge of the cooling fluid from the housing introduced by tubes 36.

It will be apparent from the foregoing description that the present thickness control system is operable to control the thickness of newly drawn sheet made of any glass composition, since all glasses increase viscosity with a decrease in temperature. Further, although illustrated with respect to a downdraw glass forming operation, it is equally applicable to controlling glass sheet thickness with conventional updraws.

As a specific illustration, molten glass having a composition as disclosed in British Patent No. 966,733 was drawn over a forming wedge at a rate of approximately 1,700 pounds per hour at a speed of about 50 inches per minute to form a sheet having a usable width of approximately 60 inches and thickness of about .070 inch. Fluid conduit tubes having an internal diameter of about ⅜ inch were positioned at one inch intervals across the width of the sheet, and with their outlet ends about ⅜ of an inch behind a one inch thick silicon carbide slab facing the forming area. The one inch spaced-apart fluid conduit tubes were positioned on opposite sides of the newly formed sheet in staggered relation, so as to effectively provide a one-half inch spacing between control units. Each conduit was provided with its own control valve and connected to a manifold having atmospheric air supplied thereto at a pressure of 1½ p.s.i.g. by means of a controllable fan. The outlet ends of the fluid conduit tubes were positioned approximately 7 inches laterally away from the molten glass forming the sheet along a line about six inches from the draw line, wherein the molten glass was at a temperature of about 1,050° C. The various control valves for the individual fluid conduit tubes were regulated between a maximum control range of 0 and 50 c.f.h., as indicated to be necessary by a thickness profile, so as to maintain virtually constant thickness uniformity across the width of the sheet. As a result of the precise control obtained with such process, the variation in thickness across the width of the sheet was maintained to within .00018 inch per inch of width across the sheet.

Although the preferred embodiments of the invention have been disclosed, it will be apparent that various changes and modifications may be made thereto without departing from the spirit and scope of the invention.

I claim:

1. A method of controlling the thickness across the width of newly formed glass sheet which comprises, directing a plurality of individual gaseous streams toward molten material forming sheet glass, impinging such gaseous streams across the width and upon the back surface of an uninterrupted wall member positioned between such streams and said newly formed sheet wherein the back surface across the width of the sheet is free from contacting elements and the wall member has high thermal conductivity, low expansion and high emissivity whereby the gases from all such streams are contained within a single enclosure to prevent such gases from contacting the newly formed sheet, and controlling the amount of flow in each such stream across the width of said wall member to selectively remove heat from said member which has been absorbed from the glass and conducted therethrough to the back surface and thereby provide a uniform temperature profile so as to maintain thickness uniformity across the width of the sheet.

2. A method of controlling the thickness of glass sheet as defined in claim 1 including the step of selectively heating certain of said gaseous streams prior to impinging the same upon the back surface of said wall member to reduce heat transfer therethrough in such selected areas.

3. A method of controlling the thickness across the width of newly formed glass sheet as defined in claim 1 including the step of varying the impingement area of the individual gaseous streams on the back surface of the said wall member to thereby vary the intensity and effective area of control of each such stream on the newly formed sheet.

4. A method of controlling the thickness of newly formed glass sheet as defined in claim 1 which includes the step of applying said plurality of individual gaseous streams in staggered relationship toward both sides of said newly formed glass sheet at equally spaced intervals along the width thereof.

5. Apparatus for controlling the uniformity of thickness across the width of newly formed sheet glass which comprises, a housing positioned adjacent molten material forming newly drawn sheet glass, a front wall having an uninterrupted back surface forming a portion of said housing and extending across the effective width of said newly formed sheet, means for mounting said front wall such that the back surface thereof except for its bounding borders is free from contact with any structure which would cause thermal discontinuity across the width of the sheet being drawn, a plurality of fluid conduit tubes extending within said housing and arranged in a row across the width of said front wall with said housing defining a single enclosing chamber for said tubes, each fluid conduit tube having an outlet end directed toward and spaced from the back surface of said front wall, manifold means providing a source of gas under pressure to said fluid conduit tubes, means for individually regulating the flowrate of said gas through each said fluid conduit tube, said front wall being formed of a low expansion material having relatively high thermal conductivity and emissivity so as to effectively absorb heat from said newly formed sheet material and conduct such heat through said front wall for dissipation responsive to the control effect provided by individually regulated gaseous streams impinged upon the back surface of said front wall by said fluid conduit tubes.

6. Apparatus as defined in claim 5 wherein a housing is positioned on each side of the newly formed glass sheet and said fluid conduit tubes are equally spaced apart in staggered relationship across the width of both housings.

7. Apparatus as defined in claim 5 including heating element means positioned within said fluid conduit tubes to preheat the gases passed therethrough prior to being discharged from the outlet ends of such tubes.

8. Apparatus as defined in claim 5 wherein said front wall is formed of silicon carbide material.

9. Apparatus as defined in claim 5 including means mounting said fluid conduit tubes for movement transversely toward and away from the back surface of said front wall to vary the control area and intensity of the gaseous discharge therefrom on the said back surface.

10. Apparatus as defined in claim 5 wherein the outlet end of each said fluid conduit tube is contoured to provide uniform flow along its vertical extent upon the back surface of said forward wall, and is provided with discharge openings to produce desired flow patterns.

References Cited

UNITED STATES PATENTS

| | | | |
|---|---|---|---|
| 1,829,640 | 10/1931 | Ferngren | 65—53 |
| 3,240,584 | 3/1966 | Zellers | 65—205 X |
| 3,244,498 | 4/1966 | Green et al. | 65—356 X |
| 3,506,429 | 4/1970 | Overman | 65—203 |

FOREIGN PATENTS

| | | |
|---|---|---|
| 708,848 | 7/1968 | Belgium. |
| 1,137,161 | 12/1968 | Great Britain. |

ARTHUR D. KELLOGG, Primary Examiner

U.S. Cl. X.R.

65—95, 203, 204, 327